United States Patent [19]

Dommer et al.

[11] Patent Number: 4,735,530
[45] Date of Patent: Apr. 5, 1988

[54] APPARATUS FOR SIMULTANEOUSLY MILLING THE SURFACES OF TWO PLASTIC PIPE SECTIONS

[76] Inventors: Armin Dommer, Eichweg 13; Dieter Dommer, Bahnhofstr. 5, both of D-7257 Ditzingen 1, Fed. Rep. of Germany

[21] Appl. No.: 934,628

[22] Filed: Nov. 25, 1986

[30] Foreign Application Priority Data

Dec. 4, 1985 [DE] Fed. Rep. of Germany ....... 3542823

[51] Int. Cl.[4] .............................................. B23C 3/12
[52] U.S. Cl. .................................... 409/138; 82/4 C; 409/199; 409/203
[58] Field of Search ................ 409/138, 199, 200, 203, 409/143, 303, 310, 313, 213, 217; 228/171, 5.1, 13; 156/258, 449, 304.2; 82/4 C

[56] References Cited
U.S. PATENT DOCUMENTS 3,552,265  1/1971  Lucas ................................... 409/203
3,793,119  2/1974  Province ............................. 156/258

FOREIGN PATENT DOCUMENTS 2246247  3/1974  Fed. Rep. of Germany .

*Primary Examiner*—Neil Abrams
*Attorney, Agent, or Firm*—Thomas W. Speckman; Ann W. Speckman

[57] ABSTRACT

An apparatus for simultaneously milling the surfaces of two plastic pipe sections facing one another, aligned parallel to one another, and mounted on a metal pipe. The plastic pipe sections may be milled on the metal pipe since the apparatus is provided with a spur gear having a recess and connected to two circular milling disks having congruent recesses and milling cutters, and arranged on both sides of a forked housing. In a specified angular position, the recess of the spur gear and the recesses of the milling disks form a U-shaped seat which merges in a semicircular end. The rotational axes of the spur gear and the milling disks coincides with the center of the semicircular end of the seat, and the width of the seat is greater than the maximum outer diameter of the metal pipe and smaller than the minimum inner diameter of the plastic pipe sections. The spur gear engages with at least one gear on each side of the forked housing, with the angular section formed between rotational axes of the gears smaller than the angular section formed by the recess of the spur gear. The gears are rotatable in the same direction by means of a synchronous belt drive.

20 Claims, 5 Drawing Sheets

APPARATUS FOR SIMULTANEOUSLY MILLING THE SURFACES OF TWO PLASTIC PIPE SECTIONS

BACKGROUND OF THE INVENTION

1. Field of the Invention

The present invention relates to an apparatus for simultaneously milling the surfaces of two plastic pipe sections facing one another, the surfaces parallel to one another, and mounted on a metal pipe section.

2. Summary of the Prior Art

There are milling apparatus for simultaneously milling the surfaces of two plastic pipe sections facing one another and having end surfaces parallel to one another provided with milling cutters mounted onto the two exterior surfaces of a single milling disk, as taught in German Patent Publication DE-OS No. 22 46 247. These devices are only suited for the end surface milling of plastic pipe sections or plastic fittings that do not contain a metal pipe. When manufacturing bends for heat conducting pipes containing an interior metal pipe onto which an exterior plastic pipe has to be mounted with a layer of foam material between, these prior art devices cannot be used for milling plastic pipe sections already mounted onto the metal pipe, since the metal pipe does not allow insertion of the milling disk between the two plastic pipe sections or plastic fittings.

SUMMARY OF THE INVENTION

It is a purpose of this invention to provide an apparatus of the type mentioned above for milling the end surfaces of plastic pipe sections mounted on a metal pipe, so that the plastic pipe sections can then be plasticized with a heating surface and welded together through pressure.

According to the present invention, this objective is achieved as follows: a spur gear with a recess is connected to two annular milling disks having congruent recesses and milling cutters; the milling disks are arranged on both sides of a forked housing and rotated together with the spur gear; in an initial angular position of the spur gear and milling disks, the recess of the spur gear and the recesses of the milling disks form a U shape terminating in a semicircular end; the rotational axis of the spur gear with the milling disks coincides with the center of the semicircular end of the seat; the width of the seat is greater than the maximum outer diameter of the metal pipe sections and less than the minimum inner diameter of the plastic pipe sections the spur gear is engaged with at least two gears in the housing with the connecting paths between the rotational axes of the gears and the rotational axis of the spur gear making an angle with the milling disks which is smaller than the angular section left open by the recess of the spur gear; and the gears are rotatable in the same direction by means of a synchronous belt drive. The spur gear with the two milling disks may be mounted on the metal pipe from the side in the initial angular position of the spur gear forming the seat, and moves continuously around the metal pipe in a rotary direction. The two circular milling disks machine the two end surfaces of the plastic pipe sections facing one another. When the milling operation has been completed, the device can be pulled off the metal pipe sideways with the angular position of the seat adjusted accordingly. This design of the seat of the spur gear and the milling disks in connection with the arrangement of the gears assures that at least one gear is engaged in the spur gear at all times to serve as its drive.

To provide a constant load on the milling disks, one embodiment features each milling disk provided with a radially arranged milling cutter and both milling cutters arranged diametrically opposite one another.

According to another embodiment, the rotary movement for the spur gear is transmitted through a gear ring with external toothing which engages in gears that are rotated in the housing, with a toothed belt disk connected to each gear, resisting torsional force.

To maintain the spur gear within the housing and independent from the set angular position, still another embodiment features both the inside and the outside of the spur gear guided by support rollers which are rotated in the housing, with adjacent support rollers arranged at an angular distance from one another which is smaller than the angular section on the outside or inside, respectively, of the spur gear, left open by the recess of the spur gear.

In another embodiment a housing is provided as an extension of the seat and forms a gear case containing a toothed belt disk whose shaft is parallel to the rotational axis of the spur gear, a toothed belt disk is provided on the gear rotated in each arm of the forked housing, and a toothed belt traverses these toothed belt disks, with a section of its pathway that is not guided over the toothed belt disk in the gear case and which may be tensioned by an idler. The synchronous belt drive is also protected in this way. The idler easily allows compensation for the slippage of the synchronous belt drive.

According to one embodiment, the transmission of rotary movement to the synchronous belt drive takes place in such a way that a spur gear follower is mounted in a torsion resistant way onto the shaft of the toothed belt disk located in the gear case and is engaged in a spur gear follower whose drive shaft is aligned perpendicular to the toothed belt disk and thus to the center axis of the seat. The drive shaft may be driven by an electric motor which, in its off position, stops the spur gear with the milling disks in a position in which the U-shaped seat is formed by the housing and the spur gear with the milling disks.

The electric motor with the gear case arranged perpendicular to the milling disks requires only a little space. This shutdown method also assures that the seat is always maintained to achieve mounting or removal of the apparatus.

The connection of the two milling disks has been achieved in a way that the milling disks face the rotational axis and terminate in flanges arranged opposite one another which are provided with tapped holes or bolt holes aligned with one another, and which cover the inside of the housing arms containing the spur gear. If the milling disks are provided with flanges which have centering pieces coordinated with one another within the area of the hub, the milling disks then adopt a definite position after being connected.

A good design for a protected rotational bearing of the gears with the toothed belt disks connected in a torsion resistant way may be obtained by rotating the gears with the connected toothed belt disks on a bearing bolt, which is screwed into a tapped hole of the housing with part of the thread, with the outer edge of the housing covering the spur gear and the synchronous belt drive.

A preferred method for attachment of support rollers is to provide the support rollers rotated on bearing bolts which are screwed into tapped holes in the bearing with part of the thread, or supported in bushings in the housing and fastened in a hole of the housing by means of a nut.

Finally, the spur gear and the two milling disks connected to one another form one unit in that the spur gear has tapped holes which are aligned with bolt holes in the milling disks, which cover the open side of the housing.

An enclosed housing for support rollers, gears, and the synchronous belt drive assembly may be provided by covering the open side of the housing outside the corresponding milling disk with a cover.

BRIEF DESCRIPTION OF THE DRAWINGS

The present invention is described in greater detail by means of the accompanying drawings, in which.

DESCRIPTION OF PREFERRED EMBODIMENTS

Figure 1:
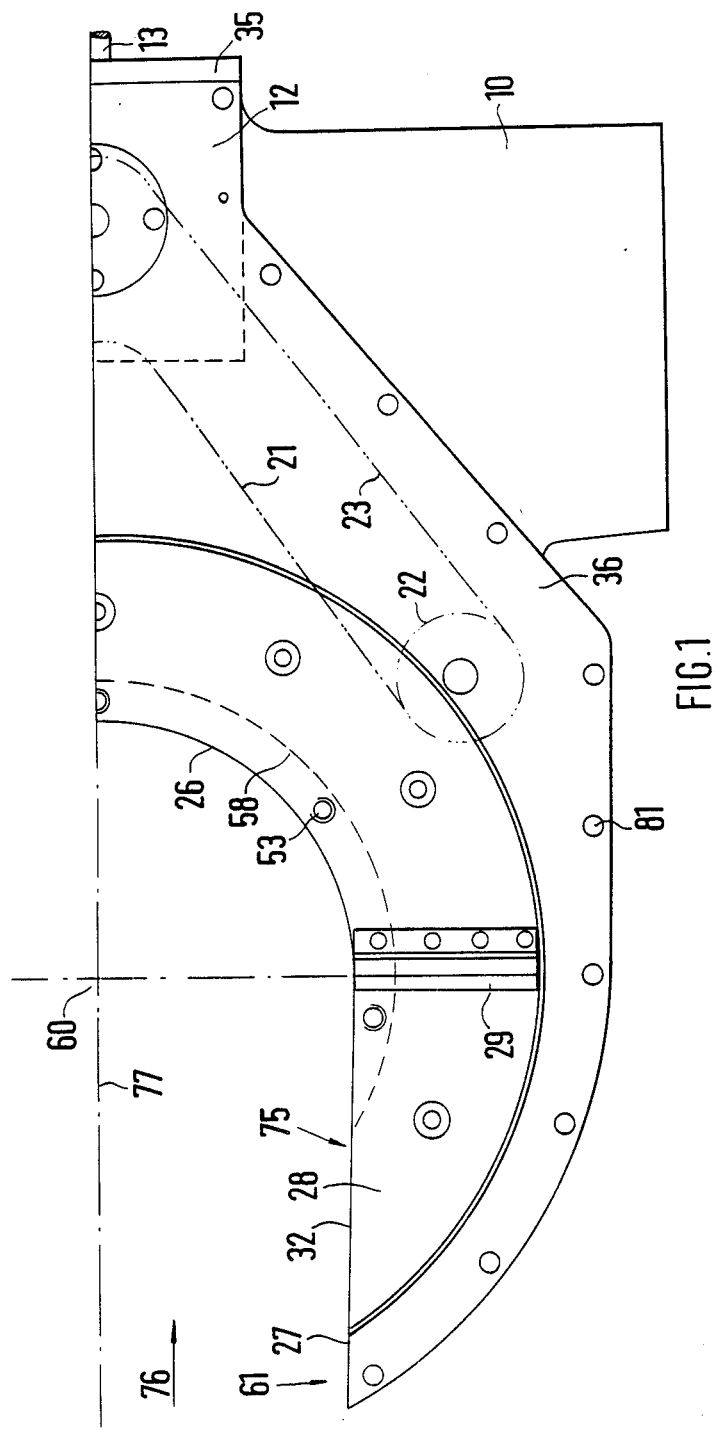
FIG. 1 shows a partial side view of the lower arm of the forked apparatus.
Figure 2:
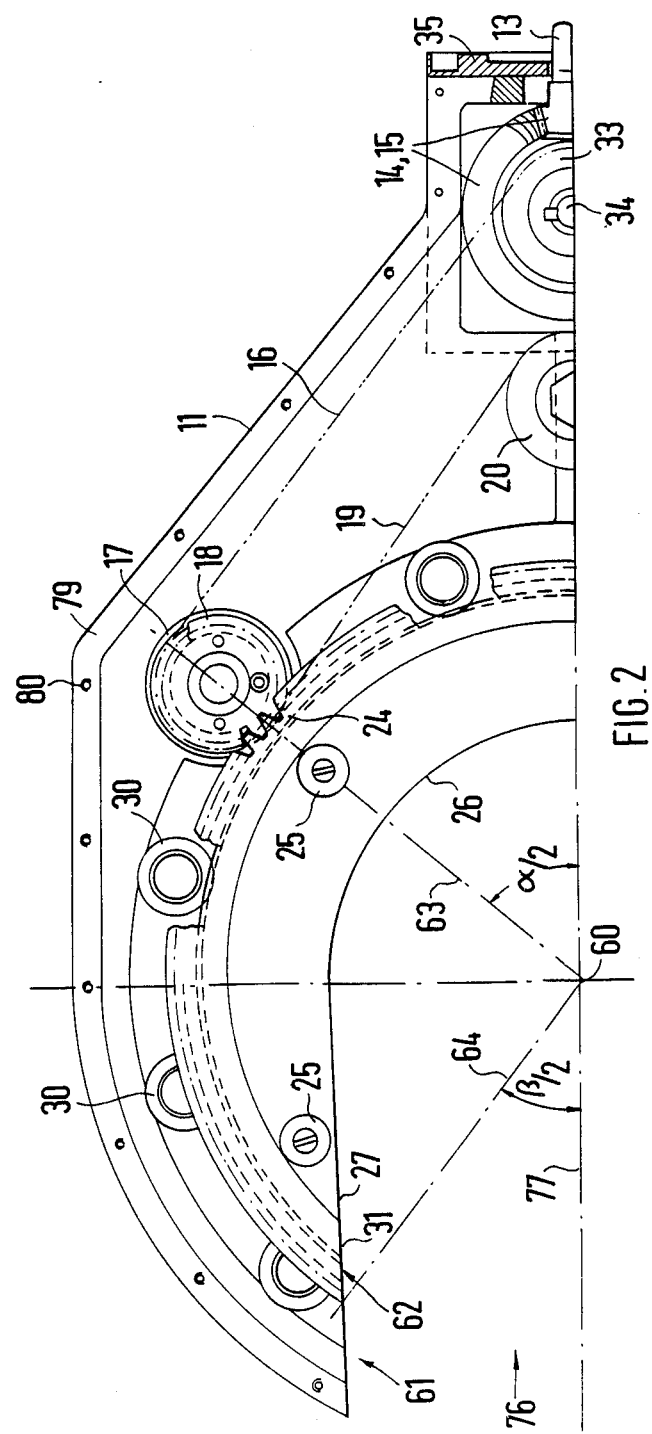
FIG. 2 shows a partial view of the upper arm of the forked apparatus with the cover removed.
Figure 3:
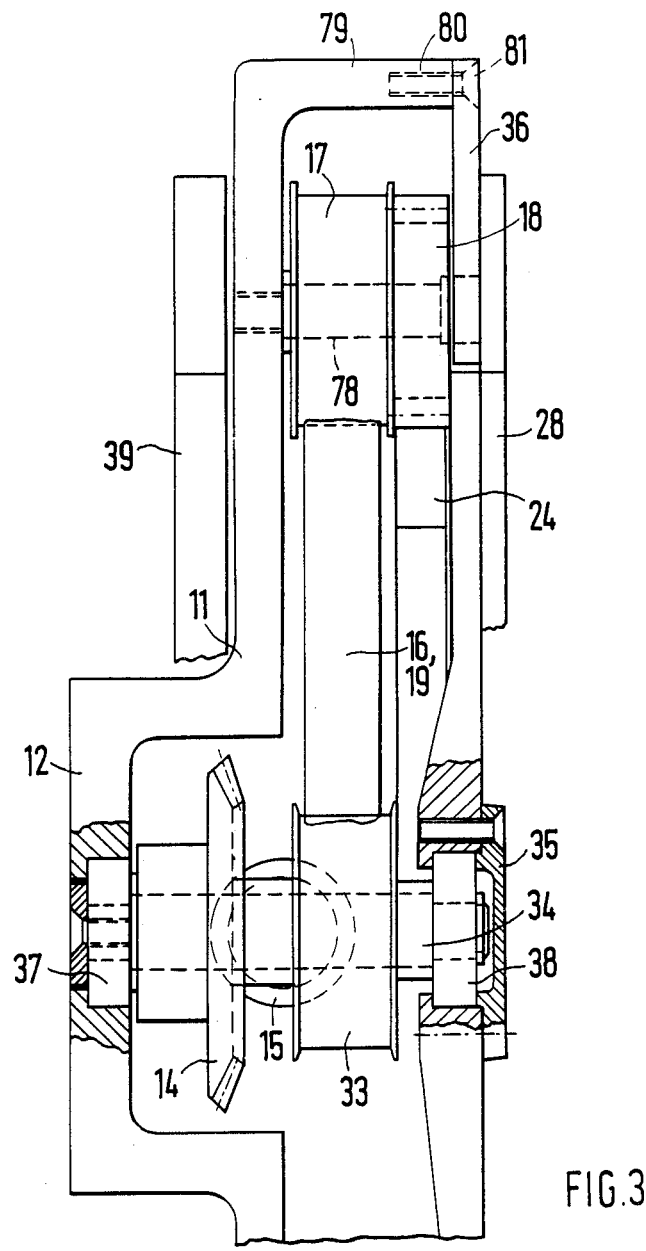
FIG. 3 shows a partially cross-sectional view through the gear case with the synchronous belt drive.

As shown in FIGS. 1 and 2, machine stand 10 merges at its upper end into forked housing 11. According to FIG. 1 the lower arm is shown from the side facing the corresponding milling disk 28, while according to FIG. 2 the upper arm is shown with the cover and milling disk 28 removed. Housing 11 forms U-shaped seat 76 which extends parallel to central longitudinal axis 77, and which merges into semicircular terminal end 26. Spur gear 24 with its external toothing is rotated inside housing 11. Rotational axis 60 of spur gear 24 coincides with the center of the semicircular terminal end 26 of seat 76. Spur gear 24 is guided by inner support rollers 25 and by outer support rollers 30, and features recess 62 whose edges 31 are flush with the edges 27 of recess 61 in housing 11 in the starting position of the device, as shown.

Figure 4:
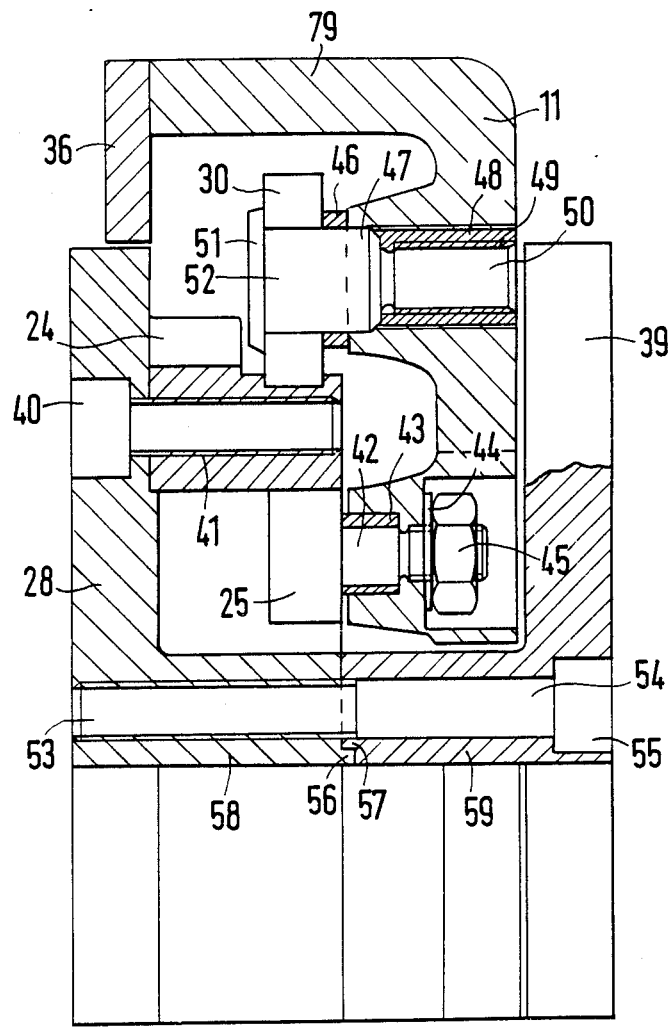
FIG. 4 shows a partially cross-sectional view through one arm of the device with the support rollers and the connection between the spur gear and the milling disks.

As shown in FIG. 4, inner support rollers 25 are rotated on bearing bolt 42 which is mounted in bushing 43, which is inserted in a bore in housing 11. Part of the thread of bearing bolt 42 which retains washer 44 and nut 45 protrudes from the bore. Outer support rollers 30 are rotated on bearing bolt 47 with holding disk 51, which snaps on with retaining elements 52 holding outer support roller 30. Outer support rollers 30 are supported against housing 11 by roller ring 46, or a similar device. Threaded part 50 of bearing bolt 47 is screwed into threaded hole 49 of bushing 48 which is mounted in a bore of housing 11. Spur gear 24 is guided on its orbit by support rollers 25 and 30. To keep the guidance clearly defined in all angular positions despite recess 62 in spur 24, the arcuate distance $\alpha$ between adjacent support rollers 25 or 30 is chosen in a way that it is always larger than the largest angular opening $\beta$ of recess 62 of spur gear 24.

Also shown in FIG. 4 is spur gear 24 with tapped holes 41 which are in axial alignment with bolt holes 40 of one of the milling disks 28. Milling disk 28 is tightly fastened to spur gear 24 by bolts. Housing 11 has outer edge 79 which covers support rollers 25 and 30 as well as spur gear 24 with the synchronous belt drive yet to be described. An exposed outer part of the open side of the housing is closed by cover 36, which is connected to outer edge 79 of housing 11 by bolts 81. Outer edge 79 is provided with blind tapped holes 80.

The inner perimeter of circular milling disk 28 is provided with inward pointing flange 58 which, together with flange 59 of the other milling disk 39, encloses the forked arms of housing 11 with support rollers 25 and 30, spur gear 24, and the synchronous belt drive on the side facing the U-shaped seat 76. Flanges 58 and 59 have coordinated centering pieces 56 and 57 at the hubs so that the milling disks 28 and 39 adopt a definite position relative to each other. Flange 58 is provided with tapped holes 53, while aligned bolt holes 54, 55 are provided in flange 59 for connecting bolts with a head. Together with milling disks 28 and 39, which are arranged on both sides of housing 11, spur gear 24 forms a unit having seat 76, as can be seen from edges 32 of recess 75 of milling disks 28 and 39 in the starting position.

Each milling disk 28 and 39 supports a radially aligned milling cutter 29. Milling cutters 29 are arranged diametrically opposite one another and are perpendicular to central longitudinal axis 77 of seat 76 in the starting position.

Spur gear 24 is driven by two gears 18 which are rotatable in housing 11 by means of bearing bolts 78. Gears 18 are engaged in the external toothing of spur gear 24 and are arranged within housing 11 in the area of semicircular end 26 of seat 76 at an angular distance $\alpha$ from one another which is symmetrical with respect to central longitudinal axis 77, and which is defined by the use of connecting lines 63 between rotational axis of gears 18 and rotational axis 60 of spur gear 24. Angle $\alpha$ is larger than angle $\beta$ forming the opening in the external toothing of spur gear 24 as shown in FIG. 2 by line 64. This assures that at least one gear 18 is engaged in the external toothing of spur gear 24 at all times.

Figure 5:
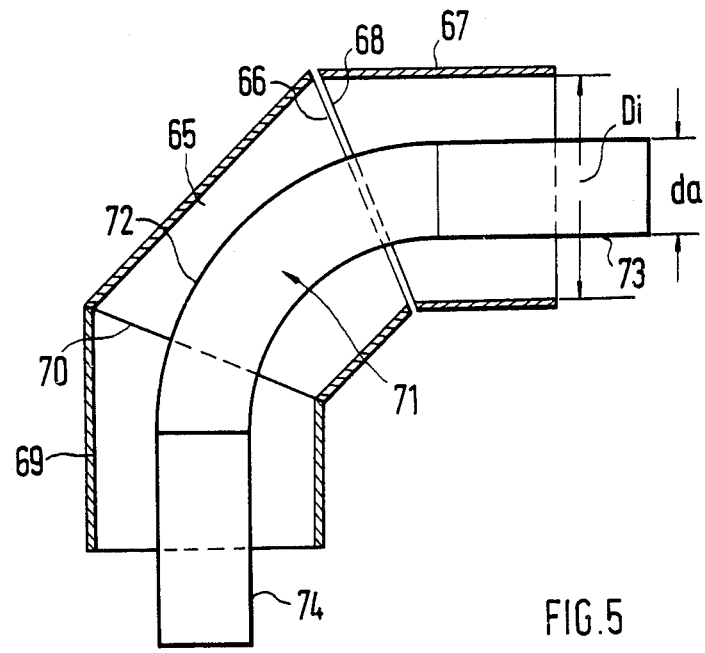
FIG. 5 shows a partially cross-sectional view of bent metal pipe section with plastic pipe sections which can be manufactured by the device according to the invention.

As shown in FIG. 5, in applications such as the manufacture of pipe bends for heat conducting pipelines, metal pipe sections 72, 73, and 74 are welded together to form metal pipe 71 with a 90° bend. Metal pipe 71 has a maximum outer diamter (da). Plastic pipe sections 65, 67 and 69 surround metal pipe 71 at a distance to leave space for an insulating layer of foam material. Plastic pipe sections 65, 67 and 69 have a minimum inner diameter (Di).

If two end surfaces 66 and 68 of plastic pipe sections 65 and 67 facing one another are to be milled simultaneously, seat 76 of the device must have a width which is larger than the maximum outer diameter (da) of metal pipe 71, so that the device can be pushed onto metal pipe 71 from the side. To mill the complete width of the surfaces, seat 76 must also have a width which is smaller than the minimum inner diameter (Di) of plastic pipe sections 65, 67 and 69. Once the end surfaces facing one another are milled, they are plasticized by heating the surfaces in a way such that they are pushed toward one another and welded together as shown by weld 70 between plastic pipe sections 65 and 69.

The milling device is driven by an electric motor not shown in the figures which rotates drive shaft 13. When the electric motor is shut off, it is guaranteed that the starting position with seat 76 open, as shown in FIGS. 1 and 2, is automatically adopted. The end of drive shaft 13 extends into gear box 12 integrated in housing 11 and carries spur gear follower 15 in a torsion resistant manner, and which is engaged in the spur gear follower 14. Lid 35 covers gear box 12 and serves as a bearing for drive shaft 13. Spur gear follower 14 is attached in a torsion resistant manner to shaft 34 which is rotated in ball bearings 37 and 38 in gear box 12. Shaft 34 supports toothed belt disk 33 in a torsion resistant way. Along path 16, the toothed belt is led to toothed belt disk 17 in the upper arm of housing 11 which is connected to gear 18 in a torsion resistant way. The return path 19 of the toothed belt leads over adjustable idler 20, and continues along path 21 to toothed belt disk 22 which is connected in a torsion resistant way with gear 18 in the lower arm of housing 11. Return path 23 of the toothed belt leads back to toothed belt disk 33 in gear box 12.

We claim:

1. Apparatus for simultaneously milling the surfaces of two plastic pipe sections facing one another, aligned parallel to one another, and mounted onto a metal pipe, wherein a spur gear (24) having a recess (62) is connected to two circular milling disks (28, 39) having congruent recesses (75) and milling cutters (29); said milling disks (28, 39) are arranged on both sides of a forked housing (11) and are rotatable simultaneously with said spur gear (24) in said housing (11); in an initial angular position of said spur gear (24) and said milling disks (28, 39) said recess (62) of said spur gear (24) and said recesses (75) of said milling disks (28, 39) form a U-shaped seat (76) having a longitudinal axis (77), said seat (76) merging into a semicircular end (26), and said spur gear (24) with said milling disks (28, 39) is aligned on a rotational axis (60) which coincides with the center of said semicircular end (26) of said seat (76); the diameter of said seat (76) is greater than a maximum outer diameter (da) of said metal pipe (71) and smaller than a minimum inner diameter (Di) of said plastic pipe sections (65, 67, 69); said spur gear (24) engages with at least one gear (18) provided in each side of said forked housing (11), with the rotational axes of said gears (18) arranged at an arcuate distance (α) from one another which is symmetrical with respect to said longitudinal axis (77) and which is larger than an angular opening (β) formed by said recess (62) of said spur gear (24); and said gears (18) are rotatable in the same direction by means of a synchronous belt drive provided in said housing (11).

2. Apparatus as described in claim 1, wherein each said milling disk (28), (29) is provided with a radially aligned milling cutter (29) and said milling cutters (29) are arranged diametrically opposite one another.

3. Apparatus as described in claim 2, wherein said spur gear (24) is provided with an external toothing which engages in said gears (18), said gears (18) are rotated in said housing (11), and each said gear (18) is connected in a torsion resistant way to a toothed belt disk (17, 22).

4. Apparatus as described in claim 3, wherein said spur gear (24) is guided by outer and inner support rollers (25, 30) provided on the outside and inside, respectively, of said spur gear (24) and rotated in said housing (11); and adjacent said support rollers (25, 30) are arranged at an arcuate distance with respect to one another which is less than said angular opening (β) formed by said recess (62) of said spur gear (24).

5. Apparatus as described in claim 4, wherein said housing (11) comprises a gear box (12) which houses a rotatable toothed belt disk (33), and a shaft (34) for rotating said toothed belt disk (33) oriented parallel to said rotational axis (60) of said spur gear (24); each said gear (18) is rotated in each arm of said forked housing (11) by a toothed belt disk (17, 22); and said synchronous belt drive comprises a toothed belt guided over said toothed belt disk (33) in said gear box (12) on one pathway (16, 23) between each of said toothed belt disks (17, 22), and said toothed belt traverses an idler (20) on the other pathway (19, 21) between said toothed belt disks (17, 22).

6. Apparatus as described in claim 5, wherein a spur gear follower (14) is mounted in a torsion resistant fashion on said shaft (34) of said toothed belt disk (33) in said gear box (12) and engages in a spur gear follower (15) having a drive shaft (13) perpendicular to said shaft (34) of said toothed belt disk (33), and aligned towards said longitudinal axis (77) of said seat (76).

7. Apparatus as described in claim 6, wherein said drive shaft (13) is driven by an electric motor which, in its off-position, maintains said spur gear (24) and said milling disks (28, 39) in a position in which said U-shaped seat (76) is formed by said housing (11), said spur gear (24), and said milling disks (28, 39).

8. Apparatus as described in claim 7, wherein said milling disks (28, 39) are facing the rotational axis (60) of said spur gear (24) and said milling disks (28, 39) terminate on their inner periphery in flanges (58, 59), respectively, said flanges (58, 59) directed toward one another, one said flange (58) provided with tapped holes (53) and the other said flange (59) provided with bolt holes (54, 55) aligned with said tapped holes (53), and covering the inside of said forked housing (11) where said spur gear (24) is located.

9. Apparatus as described in claim 8, wherein said flanges (58, 59) have aligned centering pieces (56, 57) where they meet.

10. Apparatus as described in claim 9, wherein said gears (18) together with said toothed belt disks (17, 22) are rotated on a bearing bolt (78) provided in a tapped hole in said housing (11), and said housing (11) is provided with an outer edge (79) to enclose said spur gear (24) and said synchronous belt drive.

11. Apparatus as described in claim 10, wherein said support rollers (25, 30) are rotated on bearing bolts (42, 47) screwed into tapped holes (49) in said housing (11).

12. Apparatus as described in claim 10, wherein said support rollers (25, 30) are rotated on bearing bolts (42, 47) retained in bushings (48) provided in said housing (11).

13. Apparatus as described in claim 12, wherein said support rollers (25, 30) are rotated on bearing bolts (42, 47) retained in a bore in said housing (11) by means of a nut (45).

14. Apparatus as described in claim 11, wherein said spur gear (24) is provided with tapped holes (41) and said milling disk (28) is provided with bolt holes (40) aligned with said tapped holes (41).

15. Apparatus as described in claim 14, wherein an open side of said housing (11) is protected by means of a cover (36) installed outside said milling disk (28).

16. Apparatus as described in claim 1, wherein said spur gear (24) is guided by outer and inner support rollers (25, 30) provided on the outside and inside, respectively, of said spur gear (24) and rotated in said housing (11); and adjacent said support rollers (25, 30) are arranged at an arcuate distance with respect to one another which is less than said angular opening ($\beta$) formed by said recess (62) of said spur gear (24).

17. Apparatus as described in claim 1, wherein said housing (11) comprises a gear box (12) which houses a rotatable toothed belt disk (33), and a shaft (34) for rotating said toothed belt disk (33) oriented parallel to said rotational axis (60) of said spur gear (24); each said gear (18) is rotated in each arm of said forked housing (11) by a toothed belt disk (17, 22); and said synchronous belt drive comprises a toothed belt guided over said toothed belt disk (33) in said gear box (12) on one pathway (16, 23) between each said toothed belt disks (17, 22), and said toothed belt traverses an idler (20) on the other pathway (19, 21) between said toothed belt disks (17, 22).

18. Apparatus as described in claim 1, wherein said milling disks (28, 39) are facing the rotational axis (60) of said spur gear (24) and said milling disks (28, 39) terminate on their inner periphery in flanges (58, 59), respectively, said flanges (58, 59) directed toward one another, one said flange (58) provided with tapped holes (53) and the other said flange (59) provided with bolt holes (54, 55) aligned with said tapped holes (53), and covering the inside of said forked housing (11) where said spur gear (24) is located.

19. Apparatus as described in claim 1, wherein said spur gear (24) is provided with tapped holes (41) and said milling disk (28) is provided with bolt holes (40) aligned with said tapped holes (41).

20. Apparatus as described in claim 1, wherein an open side of said housing (11) is protected by means of a cover (36) installed outside said milling disk (28).

* * * * *